US007773249B2

(12) United States Patent
Kovlakas et al.

(10) Patent No.: US 7,773,249 B2
(45) Date of Patent: Aug. 10, 2010

(54) METHOD AND SYSTEM FOR ADDRESS RECOVERY IN AN ADDRESS PRINTING SYSTEM

(75) Inventors: Paul A. Kovlakas, Milford, CT (US); Jeffrey P. Rios, Easton, CT (US); Richard A. Sloan, Jr., Southbury, CT (US); Yichun Zhang, Webster, NY (US); Brian A. Lemm, Monroe, CT (US)

(73) Assignee: Pitney Bowes Inc., Stamford, CT (US)

( * ) Notice: Subject to any disclaimer, the term of this patent is extended or adjusted under 35 U.S.C. 154(b) by 1500 days.

(21) Appl. No.: 11/119,690

(22) Filed: May 2, 2005

(65) Prior Publication Data

US 2006/0244999 A1 Nov. 2, 2006

(51) Int. Cl.
*G06K 15/00* (2006.01)
*G06F 3/12* (2006.01)

(52) U.S. Cl. .................... 358/1.16; 358/1.14; 358/1.18

(58) Field of Classification Search ................ 358/1.14, 358/1.16, 1.17, 1.15, 1.13, 1.18, 1.1, 1.2, 358/1.5, 1.6, 1.9, 1.11, 1.12, 401, 402, 403, 358/404, 407, 444, 426.05, 468; 283/81; 382/101, 102; 399/8, 9, 1; 347/2, 3, 5, 14, 347/23; 705/60, 62; 710/52, 53, 54, 55, 710/56, 310

See application file for complete search history.

(56) References Cited

U.S. PATENT DOCUMENTS 4,630,198 A * 12/1986 I-Yuan ....................... 711/118
5,170,397 A * 12/1992 Hurtz et al. .................... 714/2
5,235,676 A * 8/1993 Clay et al. ................ 358/1.14
5,413,419 A * 5/1995 Oami et al. ................... 400/61
5,532,839 A * 7/1996 Beikirch et al. ............. 358/401
5,684,934 A * 11/1997 Chen et al. ................ 358/1.14
5,822,505 A * 10/1998 Okada ...................... 358/1.14
6,030,072 A * 2/2000 Silverbrook ................. 347/67
6,088,119 A * 7/2000 Manchala et al. .......... 358/1.14
6,377,356 B2 * 4/2002 Sakamoto et al. .......... 358/1.14
6,388,760 B2 * 5/2002 Kadota et al. .............. 358/1.14
6,504,619 B1 * 1/2003 Kageyama et al. ......... 358/1.14
2003/0095279 A1 * 5/2003 Kim .......................... 358/1.14
2004/0046986 A1 * 3/2004 Kuwabara et al. .......... 358/1.14
2005/0052679 A1 * 3/2005 Green et al. ............... 358/1.14

* cited by examiner

*Primary Examiner*—Dov Popovici
(74) *Attorney, Agent, or Firm*—Brian A. Lemm; Angelo N. Chaclas

(57) ABSTRACT

A method and system for recovering addresses in an address printing system is provided. A resume marker is set at the current location in the print buffer, used to buffer the addresses for printing, from which the next address will be read for printing. The address in the buffer location preceding the location where the resume marker is set is reprinted. The user can compare the reprinted address to the mail pieces already processed to determine if it is a duplicate. If not a duplicate, the address in the next preceding location can be reprinted. This processing continues until a duplicate address is printed, indicating that the address printing system properly printed all of the previous addresses in the address list up to the point of the duplicate. The print job will then automatically continue from the location where the resume marker was set.

13 Claims, 3 Drawing Sheets

METHOD AND SYSTEM FOR ADDRESS RECOVERY IN AN ADDRESS PRINTING SYSTEM

FIELD OF THE INVENTION

The invention disclosed herein relates generally to mail processing systems, and more particularly to methods and systems to recover addresses in an address printing system.

BACKGROUND OF THE INVENTION

Mail creation and finishing equipment to generate and process mail pieces are well known and have enjoyed considerable commercial success. Such generating and processing can include, for example, accumulating documents with other materials such as preprinted inserts, folding and inserting the resulting accumulations into envelopes, printing addresses and other information on the outside of the envelopes, and franking the envelopes with an appropriate postage amount.

One metric used by customers for determining satisfaction with mailing equipment is the throughput, i.e., the number of mail pieces that can be processed per hour or minute. Generally, customers desire to have as high a throughput as possible. It is therefore desirable to have the equipment operate at the highest rate of speed possible to maximize the throughput. Address printers are capable of printing addresses on mail pieces at a rate of six envelopes per second (21,600 envelopes per hour) and eight postcards per second (28,800 postcards per hour). The addresses are received from an address list, such as, for example, from a personal computer coupled to the address printer, temporarily stored in a print buffer and then provided to a print head in succession for printing on the mail piece, e.g., envelope, postcard, or the like, by the print head. Another metric used by customers in determining satisfaction with mailing equipment is productivity, i.e., the amount of time the equipment is operational. Customers require high productivity, i.e., the mailing equipment must be operating with little down time due to any type of malfunction, and recovery must be quick. Although address printers are designed for such high speed operation and generally operate well at those speeds with high productivity, malfunctions can still occur, such as, for example, a malfunction of the print head, e.g., clogged ink nozzles, low ink, out of ink, etc., or a mail piece becoming jammed in the address printer, a feeding module prior to the address printer, or a module downstream of the address printer that receives the mail pieces from the address printer. When any type of malfunction occurs, there is a delay associated with correcting the malfunction, thereby reducing productivity, and also a risk of mail pieces not being properly printed with an address and addresses from the address list being "lost," i.e., not being printed on a mail piece. For example, when a malfunction occurs, addresses from the print buffer will still be provided to the print head and, even though not properly printed on a mail piece, assumed to have been printed by the address printer, before the processing can be halted.

To prevent the loss of any addresses from the address list, it is necessary to reprint those mail pieces that the address printer attempted to print but were not properly printed. For address printers that utilize 16-bit operating systems, in which the print data is ASCII character mapped, the manner in which font downloads are handled enables the user to scroll back through the print buffer using a display of the address printer. Because of the character mapping utilized, the print data appears on the display in human readable form, and the user can therefore browse back through the address buffer until the last successfully printed address on a mail piece is found, and then restart the print job from that location. There are problems, however, when the address printer utilizes a 32-bit operating system, where the font downloads are handled quite differently. In 32-bit operating systems, an ID is assigned to each character the first time that character is downloaded. The ID assigned may be in hexadecimal format, or some other type of non-displayable character. The result is that the print data displayed on the address printer display will not be human readable, and therefore the user is unable to identify the last successfully printed address in the print buffer using the display of the address printer.

One way to overcome this problem is to cancel the entire print job and clear the print buffer of any stored addresses. The user must then review the address list, using the personal computer that generated the address list, to determine the last address in the address list that was properly printed before the malfunction occurred, and start a new print job from the next address. This process of canceling the current print job, reviewing the address list and starting a new print job is time consuming and labor intensive, thereby significantly decreasing the productivity of the equipment. Another way to overcome this problem is to hardcode a recovery capability in which a predetermined number of addresses from the print buffer will be reprinted. For example, when an address recovery function is entered, the buffer can back-up the predetermined number of locations, e.g., ten locations, and restart the print job from that location, such that the last ten entries in the buffer will be reprinted when the print job is restarted. While this may work in some cases, there are still problems with this solution. For example, if the number of reprints necessary is less than the predetermined number, there will be some mail pieces that were reprinted that did not need to be reprinted, resulting in duplicate mail pieces and a waste of resources. If the number of addresses lost is greater than the predetermined number, those addresses not within the predetermined number will remain lost and never be printed. In either situation, the result is unacceptable and can lead to customer dissatisfaction with the address printer.

Thus, there exists a need for a method and system for recovering addresses in an address printing system that minimizes the amount of duplicates printed while ensuring that all addresses from the address list are successfully printed on a mail piece.

SUMMARY OF THE INVENTION

The present invention alleviates the problems associated with the prior art and provides a method and system for recovering addresses in an address printing system that minimizes the amount of duplicates printed while ensuring that all addresses from the address list are successfully printed on a mail piece.

In accordance with embodiments of the present invention, when an address recovery feature is selected, a resume marker is set at the current location in the print buffer, used to buffer the addresses for printing, from which the next address will be read for printing. The user is then queried if the address in the buffer location preceding the location where the resume marker is set should be reprinted. Alternatively, the address printing system could automatically reprint the address in the buffer location preceding the location where the resume marker is set without requesting an input from the user. The user can then compare the reprinted address to the mail pieces already processed to determine if it is a duplicate of a properly printed address. The user is then queried if the address in the next preceding location, i.e., the second location preceding the location at which the resume marker is set, should be reprinted. If the address just printed is a duplicate of a properly printed address, then no addresses have been lost, the user provides a "No" response to the query, and the print job will automatically continue from the location where the resume marker was set. If the address just printed is not a duplicate of a properly printed address, indicating that the address was not previously printed, the user provides a "Yes" response and the address in the next preceding location is reprinted. This processing continues until a reprint is a duplicate of a properly printed address, indicating that the address printing system properly printed all of the previous addresses in the address list up to the point of the reprinted duplicate. Once a reprinted address is a duplicate of a properly printed address, the user provides a "No" response to the query of printing the address in the next preceding location, and the print job will automatically continue from the location where the resume marker was set. Thus, regardless of the number of addresses that were not properly printed, the user can return to reprint each of the addresses that were not properly printed while only needing to reprint at most a single duplicate or possibly no duplicates. By utilizing the processing described above and the resume marker to identify the location at which the print job should be continued, no addresses from the address list will be lost in the event of a malfunction of the address printing system, and at most only a single duplicate needs to be reprinted to ensure that all addresses have been recovered.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PRESENT INVENTION

Figure 1:
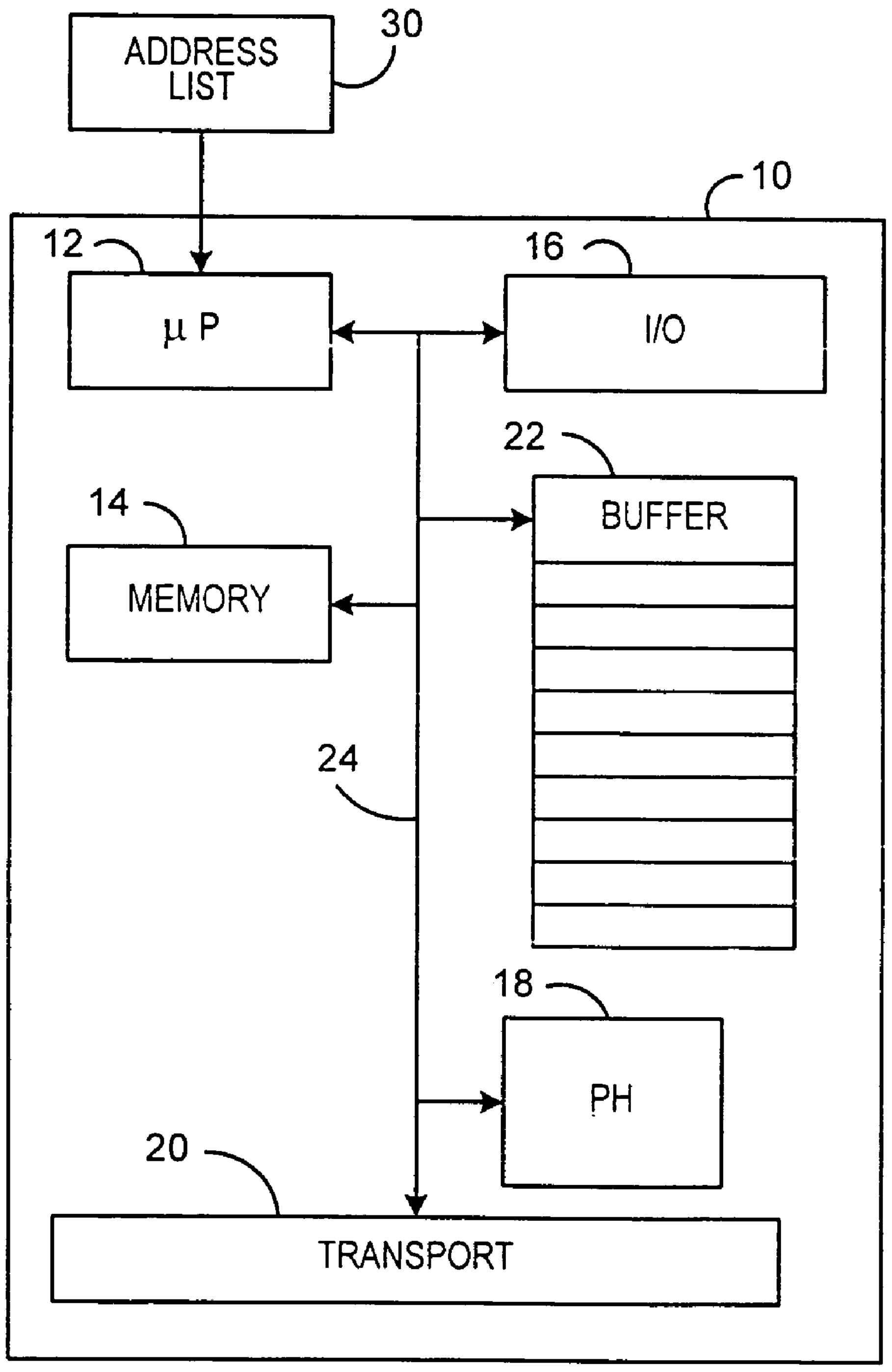
FIG. 1 illustrates in block diagram form an address printing system capable of performing processing according to embodiments of the present invention.

In describing the present invention, reference is made to the drawings, wherein there is seen in FIG. 1 in block diagram form an address printing system 10 capable of performing processing according to embodiments of the present invention. Address printing system 10 includes a microprocessor unit 12 to control operation of the address printing system 10. Microprocessor 12 may be, for example, a general or special purpose processor or the like. A memory 14 is coupled to the microprocessor 12 for storage of software executable by microprocessor 12, e.g., processing instructions utilized by microprocessor 12. Memory 14 may be, for example, random access memory (RAM), read only memory (ROM) or a combination of the two. Address printing system 10 further includes one or more input/output devices 16, such as, for example, a keyboard and/or display unit for the input and output of various data and information. A print head (PH) 18 is used to print information on to mail pieces that are being transported through the address printer by transport 20. Print head 18 can utilize any type of printing technology, such as, for example, ink-jet technology or the like. Transport 20 can be any conventional type of transport system that includes, for example, rollers and/or belts, to transport mail pieces through the address printing system 10, based on signals provided from the microprocessor 12, and past the print head 18 such that printing can occur on each mail piece. A buffer 22 is used to temporarily store information to be printed by the print head 18. Buffer 22 can be, for example, a random access memory (RAM) device and is preferably implemented as a circular buffer that includes both read and write markers to indicate the location in the buffer 22 where data for printing is to be read from and the location in the buffer 22 where new data is to be written. The various components of the address printing system 10 are in operative communication with each other over conventional communication lines, such as a communication bus 24. Each of the components of the address printing system 10 may be integrated into a single unit, as illustrated in FIG. 1, or alternatively may be provided as separate units coupled together to form a production system.

During operation, an address list 30 is passed to the address printing system 10. Address list 30 may be provided, for example, from a personal computer, database, network connection, or the like, and includes a sequential list of address data for printing on mail pieces being processed by the address printing system 10. The address list 30 can include hundreds up to tens of thousands of addresses. The microprocessor 12 will begin the print job for the address list 30 by loading a portion of the addresses from the address list 30 into the buffer 22. Each address can then be read and printed by the print head 18 on a mail piece being transported through the address printing system 10 by transport 20. As noted above, buffer 22 is preferably implemented as a circular buffer such that memory locations within the buffer 22 will be overwritten with new data, thereby keeping the size of the buffer 22 to a minimum while still being able to process large address lists. As the addresses are loaded into the buffer 22, a write marker is used to indicate the location in the buffer 22 where the next address from the address list 30 is to be written, and then incremented accordingly to the next location. As printing is occurring, a read marker is used to indicate the location in the buffer 22 where the next address is to be read for printing by the print head 18, and then incremented accordingly to the next location. Buffer 22 is preferably sized such that data is stored in the buffer for some period of time before it is overwritten with new data. For example, the buffer 22 can be sized such that anywhere between twenty and ninety nine addresses can be stored at a time.

Address printing system 10 is capable of operating at very high throughput speeds, e.g., six envelopes per second (21,600 envelopes per hour) and eight postcards per second (28,800 postcards per hour). As such, when a print job is halted due to occurrence of a malfunction, there is a period of time between the actual occurrence of a malfunction and when the address printing system 10 will halt operation due to the malfunction. During this period of time, however, print head 18 will continue to read addresses from the buffer 22, increment the read marker, and perform a printing operation. Such a malfunction could include, for example, a jam in the transport 20, in a feeder unit (not shown) that feeds mail pieces to the address printing system 10, or an output unit (not shown) that receives the printed mail pieces from the address printing system 10. When a jam occurs, the mail pieces are not properly transported past the print head 18. This can result in one or more addresses not being properly printed on a mail piece due to the jam condition. Another type of malfunction that can occur is with operation of the print head 18, including, for example, a low ink or an out of ink condition. This can result in one or more addresses not being readable on a mail piece due to the low ink or out of ink condition, and therefore the addresses have not been properly printed. If any type of malfunction persists for even only a few seconds before being identified, there is the potential that dozens of mail pieces will not be properly printed and the addresses intended for those mail pieces lost, i.e., never printed on a mail piece during the current print job, as the read marker will already have been incremented beyond the locations storing those addresses.

Figure 2:
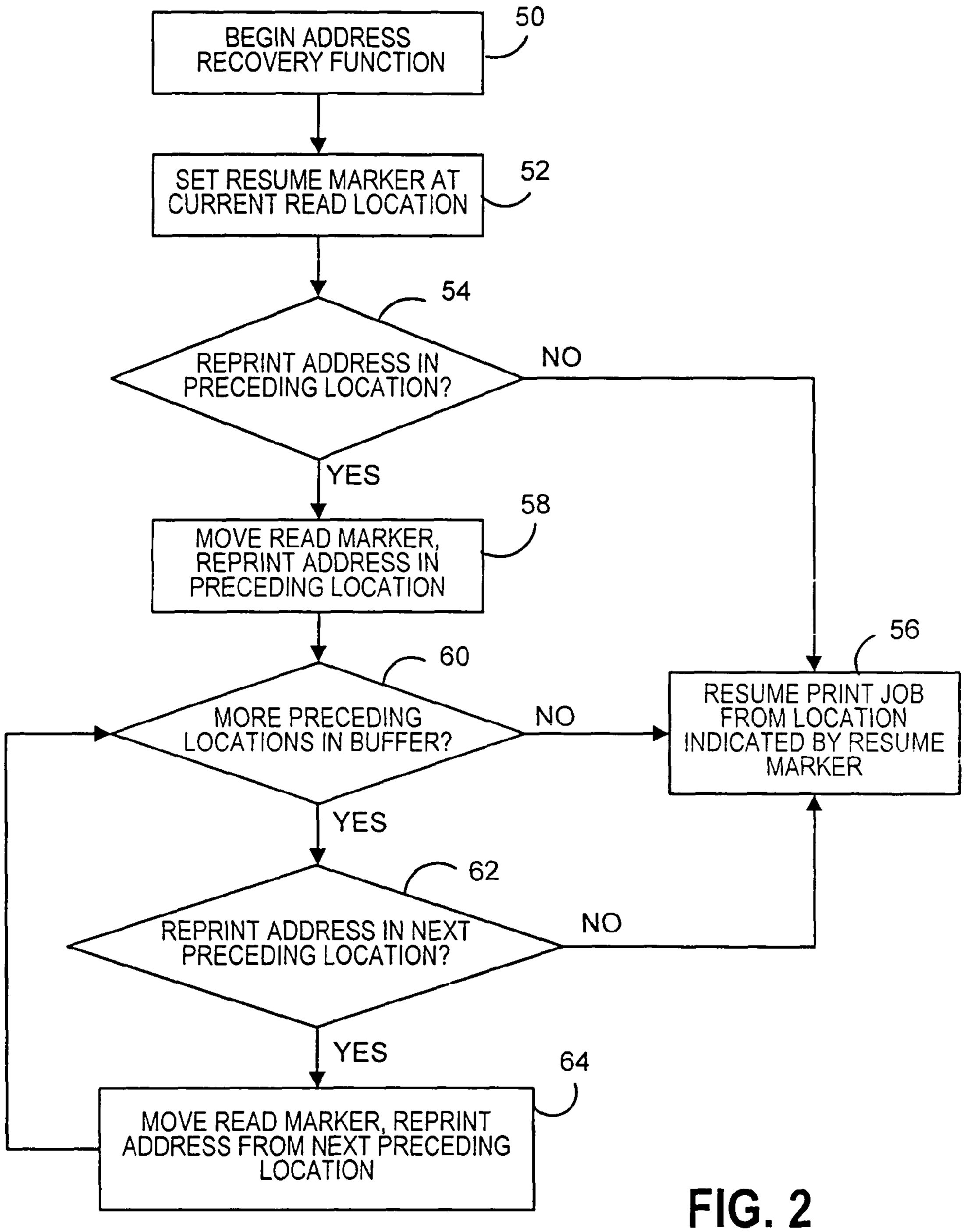
FIG. 2 illustrates in flow chart form the processing performed by the address printing system according to an embodiment of the present invention.
Figure 3:
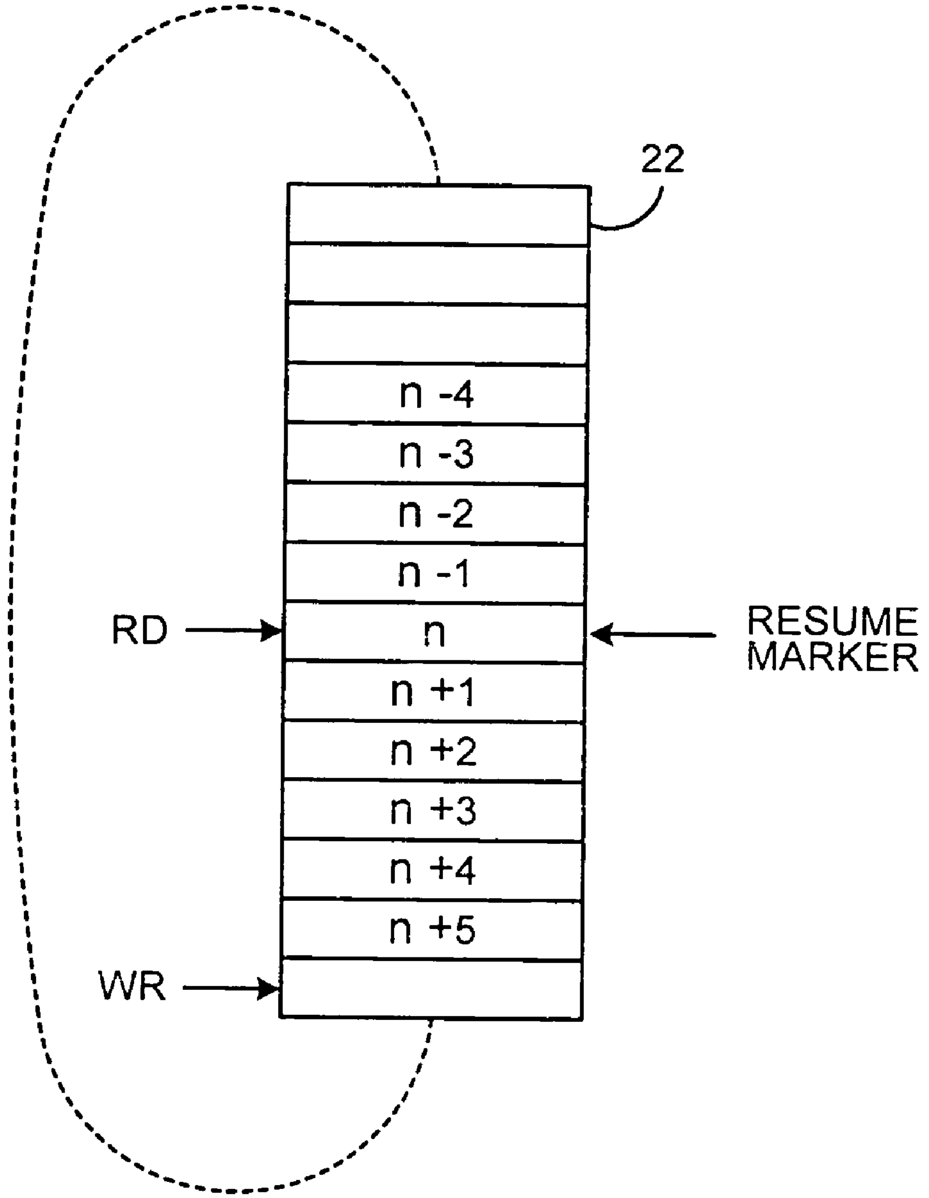
FIG. 3 illustrates a buffer used during processing performed by the address printing system according to an embodiment of the present invention.

To prevent any addresses from being lost if a print job is stopped before completion for any reason, including, for example, a malfunction as described above, the address printing system 10 according to an embodiment of the present invention includes an address recovery function. The address recovery function can be implemented as software instructions stored in the memory 14 and executed by the microprocessor 12. The processing performed by address printing system 10 during the address recovery function according to an embodiment of the present invention is illustrated in flow diagram form in FIG. 2. In step 50, the address printing system 10 will begin the address recovery function. This can be based on receiving a command from the user via I/O device 16, or can be automatic after any type of malfunction or stoppage of a print job while in progress has been detected. Such detection could be performed, for example, by optical sensors (not shown) located along the transport 20. In step 52, microprocessor 12 will set a resume marker at the current read location in the buffer 22. FIG. 3 illustrates the buffer 22 where the read marker (RD) and resume marker are both set at location n. Thus, location n is the next location that will be read and printed if the print job was continued at this point. In step 54, the user is asked if the address in the preceding location of the buffer 22, i.e., location n−1, should be reprinted. The user can respond, for example, using the I/O device 16. If the user does not wish to reprint the address stored in location n−1, then in step 56 the print job will resume from the location indicated by the resume marker, location n. Such a situation may occur, for example, if the user is not concerned with addresses being lost and wishes to immediately exit the address recovery function and continue the print job. If in step 54 it is determined that the user does wish to reprint the address in the preceding location (location n−1), then in step 58 the read marker is moved from location n to location n−1 and the address from location n−1 will be reprinted on a mail piece. The resume marker will remain at location n. Optionally, step 54 need not be performed, and the address recovery function can automatically reprint the address in the preceding location n−1.

The user can then compare the reprinted address with mail pieces previously processed, and more specifically the last address properly printed on a mail piece, to determine if it is a duplicate. In step 60 the microprocessor 12 determines if there are more preceding locations in the buffer 22 from which the address data may not have been properly printed. Since buffer 22 is preferably implemented as a circular buffer, more preceding locations will exist so long as the address data in the next preceding location has already been passed by the read marker (RD) and is not new address data. This can be determined by the location of the write marker (WR) in the buffer 22. More preceding locations will exist so long as the next preceding location in the buffer 22 has not backed-up all the way to the location where the write marker (WR) is located. Since the write marker is always ahead of the read marker, the addresses stored in the buffer 22 between location n, where processing will resume, and the write marker (WR) in the forward direction (e.g., locations n+1, n+2, etc.) are new addresses added to the buffer 22 for which printing has not yet been attempted and therefore can not have been lost, i.e., improperly printed. Conversely, the addresses stored in the buffer 22 between location n and the write marker (WR) in the backward direction (e.g., locations n−1, n−2, etc.) are old addresses in the buffer 22 for which printing has been attempted and therefore may have been lost, i.e., improperly printed. If in step 60 it is determined that there are no more preceding locations in the buffer 22, then in step 56 the print job will resume from the location indicated by the resume marker, location n.

If in step 60 it is determined that there are more preceding locations in the buffer 22, then in step 62 the user is asked if the address in the next preceding location of the buffer 22, i.e., location n−2, should be reprinted. The response provided by the user is typically based on whether or not the reprinted address from location n−1 has already been properly printed on a mail piece and therefore the reprint is a duplicate of a properly printed address. If the address reprinted from location n−1 is a duplicate of a properly printed address, this indicates that all addresses up to that location have been properly printed, those addresses between location n−1 and location n have been reprinted, and the print job can be restarted from location n, with no addresses having been lost. Alternatively, the user may wish to exit the address recovery function at this point without regard for any lost addresses and provide a "No" response in step 62. If the user responds with a "No" in step 62, then in step 56 the read marker will be moved back to location n, as indicated by the resume marker, and the print job will automatically resume from location n. If in step 62 it is determined that the user does wish to reprint the address from the next preceding location n−2, then in step 64 the read marker (RD) is moved from location n−1 to location n−2 and the address from location n−2 will be reprinted on a mail piece. The resume marker will remain at location n. The processing then returns to step 60 and will repeat for each consecutive preceding location (n−3, n−4, etc.) until either there are no more preceding locations remaining in the buffer 22, or a signal is provided by the user indicating that either a duplicate of a properly printed address has been printed and the address from the next consecutive preceding location should not be printed, or the user desires to exit the address recovery function, at which point the print job will automatically resume from the proper location as indicated by the resume marker.

Through each iteration, the read marker (RD) will move when an address is reprinted while the resume marker will always stay at location n. When a reprinted address is determined to be a duplicate of a properly printed address, or if there are no preceding locations left in the buffer 22, the print job can resume from the location indicated by the resume marker. Thus, regardless of the number of addresses that were not properly printed, the user can return to reprint each of the addresses that were not properly printed while only needing to reprint a single duplicate. In some cases, it may not be required to reprint a duplicate of a properly printed address. For example, if the address printing system 10 is running low on ink such that the printed addresses are sequentially deteriorating in print quality, it may not be necessary for the user to reprint all addresses until a duplicate of a properly printed address is printed. Instead, if the user can identify the first address for which print quality if unacceptable, the user can reprint only up to that location and then continue the print job from the location indicated by the resume marker. Thus, no duplicate of a properly printed address needs to be printed.

By utilizing the processing described above and the resume marker to identify the location at which the print job should be continued, no addresses from the address list will be lost in the event of a malfunction of the address printer, and at most only a single duplicate, if any, needs to be reprinted to ensure that all addresses have been recovered. Since the above processing is not dependent on the user being able to view the addresses on the I/O 16, e.g., display device, of the address printing system 10, the present invention can be utilized regardless of the operating system used by the microprocessor 12 and the way in which the font downloads are handled when printing is occurring.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. In an address printing system having a buffer for storing a plurality of addresses for printing on respective mail pieces, each of the plurality of addresses being stored in a respective location in the buffer, a method for reprinting addresses that were not properly printed on mail pieces when a print job is stopped before completion, the method comprising:

setting a marker at a location in the buffer from which a next address would have been read for printing when the print job was stopped;

reprinting on respective mail pieces addresses from consecutive locations preceding the location in the buffer at which the marker is set until a signal is received indicating no additional reprints are to be printed; and automatically resuming the print job from the location at which the marker is set based on receipt of the signal.

2. The method of claim 1, wherein reprinting on respective mail pieces addresses from consecutive locations further comprises:

reprinting on respective mail pieces addresses from consecutive locations preceding the location in the buffer at which the marker is set until a signal is received indicating a duplicate of a properly printed address has been printed or there are no more locations preceding the location in the buffer at which the marker was set that contain addresses for which printing was previously attempted.

3. The method of claim 1, wherein reprinting on respective mail pieces addresses from consecutive locations further comprises:

requesting input from a user if an address from a location in the buffer immediately preceding the location at which the marker is set should be reprinted;

receiving an input from the user; and reprinting on a mail piece the address from the location in the buffer immediately preceding the location at which the marker is set if requested by the user.

4. The method of claim 3, wherein if the user does not request to reprint the address from the location in the buffer immediately preceding the location at which the marker is set, the method further comprises:

automatically resuming the print job from the location at which the marker is set.

5. The method of claim 1, wherein before the marker is set at a location in the buffer from which a next address would have been read for printing when the print job was stopped, the method further comprises:

beginning an address recovery function after the print job has been stopped.

6. The method of claim 5, wherein beginning the address recovery function further comprises:

detecting a malfunction in the address printing system;

stopping the print job based on detection of the malfunction; and automatically beginning the address recovery function after the print job has been stopped.

7. The method of claim 6, wherein the malfunction includes a jam condition.

8. The method of claim 6, wherein the malfunction includes an out of ink condition.

9. The method of claim 5, wherein beginning an address recovery function further comprises:

beginning an address recovery function based on a request made by a user.

10. An address printing system for mail pieces comprising:

a processor to control operation of the address printing system;

a print head coupled to the processor for printing addresses on respective mail pieces;

a buffer coupled to the processor and the print head, the buffer storing addresses for a print job in a respective location for reading and printing by the print head;

means for setting a marker at a location in the buffer from which a next address would have been read for printing when the print job is stopped before completion;

means for reprinting on respective mail pieces addresses from consecutive locations preceding the location in the buffer at which the marker is set until a signal is received indicating no additional reprints are to be printed; and means for automatically resuming the print job from the location at which the marker is set based on receipt of the signal.

11. The address printing system of claim 10, wherein the signal indicates a duplicate of a properly printed address has been printed.

12. The address printing system of claim 10, further comprising:

means for determining if there are more locations preceding the location in the buffer at which the marker is set that contain addresses for which printing was previously attempted.

13. The address printing system of claim 12, wherein the signal indicates there are no more locations preceding the location in the buffer at which the marker is set that contain addresses for which printing was previously attempted.

* * * * *